H. C. STRACK.
GARDEN TOOL.
APPLICATION FILED JAN. 19, 1917.
1,252,627.
Patented Jan. 8, 1918.
2 SHEETS—SHEET 1.
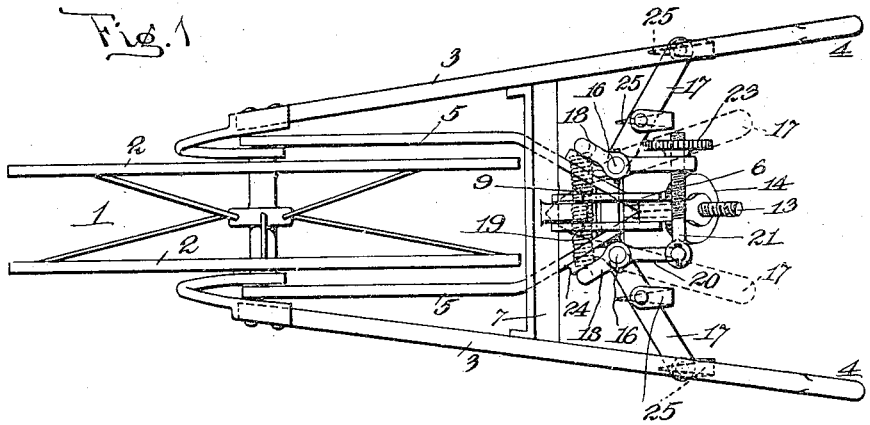
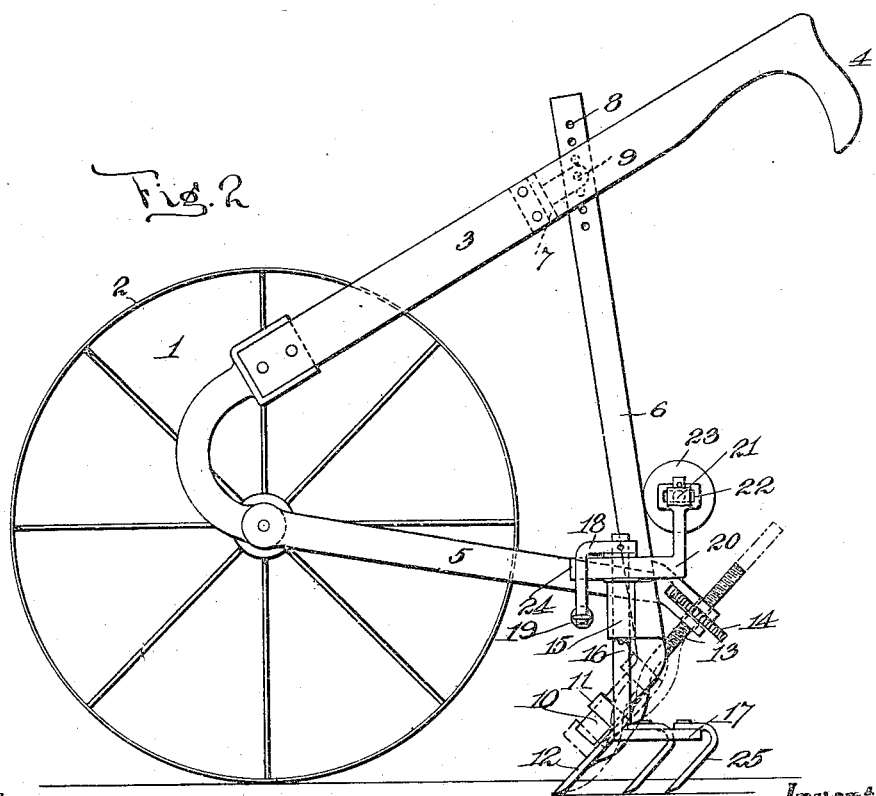
Witnesses:
Inventor
Henry C. Strack
By Dyer & Taylor
his Attorneys H. C. STRACK.
GARDEN TOOL.
APPLICATION FILED JAN. 19, 1917.
1,252,627.
Patented Jan. 8, 1918.
2 SHEETS—SHEET 2.
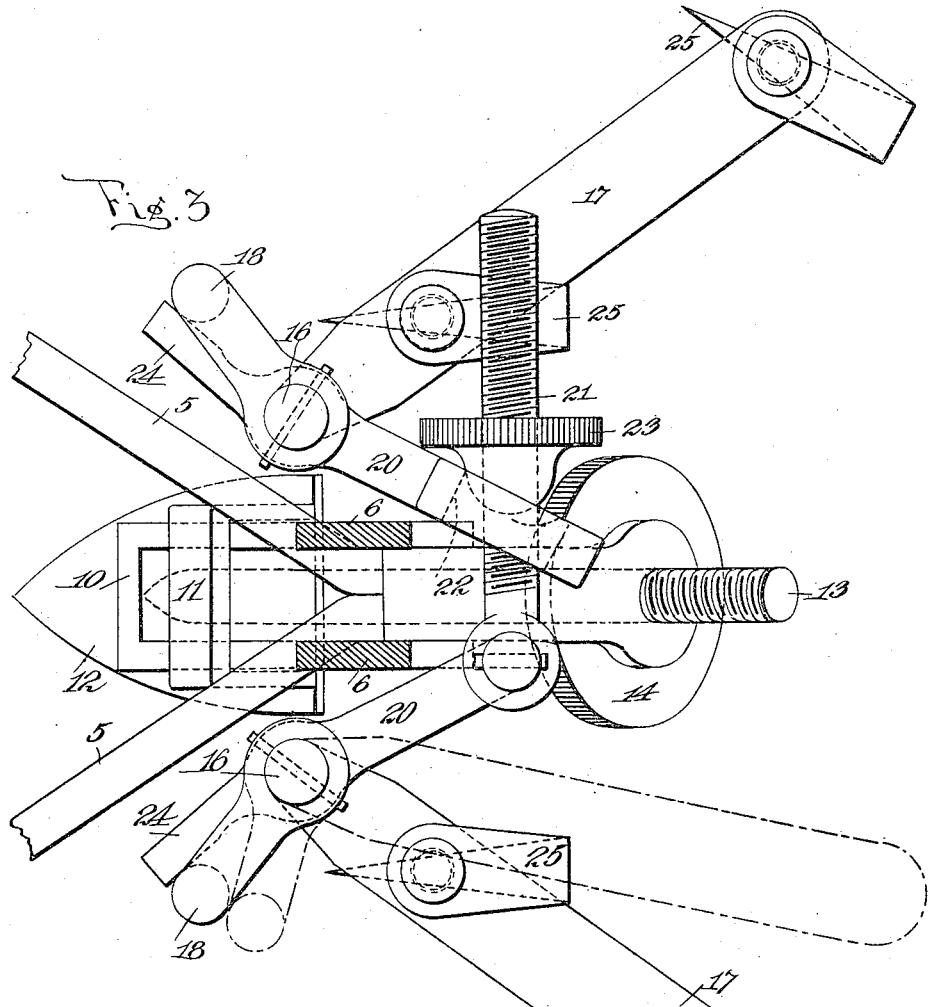
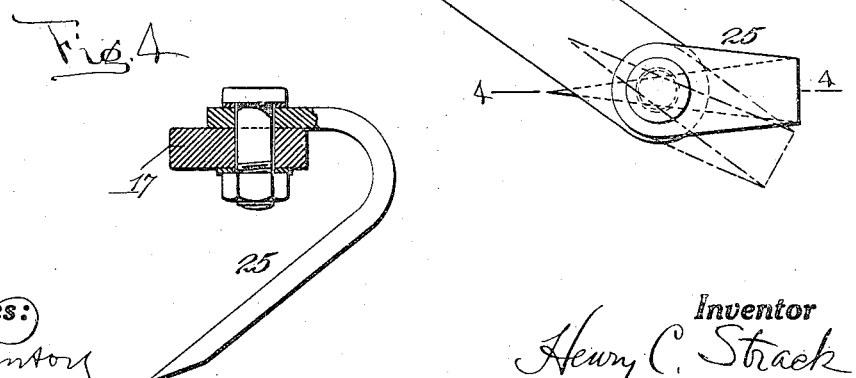
Witnesses:
Inventor
Henry C. Strack
By Dyer & Taylor
his Attorneys.

UNITED STATES PATENT OFFICE.

HENRY C. STRACK, OF OWEGO, NEW YORK.

GARDEN-TOOL.

1,252,627.  Specification of Letters Patent.  Patented Jan. 8, 1918.

Application filed January 19, 1917. Serial No. 143,266.

*To all whom it may concern:*

Be it known that I, HENRY C. STRACK, a citizen of the United States, and a resident of Owego, in the county of Tioga and State of New York, have invented a certain new and useful Improvement in Garden-Tools, of which the following is a specification.

My invention relates to garden tools and particularly to hand operated devices and has for its object to provide a device wherein the tools will be always in engagement with the ground and will pass around obstructions instead of over them.

A further object is to provide for relative movement of the tools and frame whereby the entire surface of the ground within the limits of the device will be operated upon by the tools.

A further object is to regulate the width of the operating tools to accommodate the device to wide or narrow rows.

A still further object is to regulate the depth of cut.

A still further object is to produce a device capable of use for different purposes and which may be adapted to its different uses without the use of separate parts and without the use of tools.

These and further objects will more fully appear in the following specification and accompanying drawings considered together or separately.

I have illustrated my invention in the accompanying drawings in which similar reference characters designate corresponding parts in all of the several figures, and in which—

Figure 1 is a top plan view of a hand cultivator constructed in accordance with my invention.

Fig. 2 is a side elevation of the same.

Fig. 3 is a detail plan view of the tool carrying and operating devices, and

Fig. 4 is a detail section taken on the line 4—4 of Fig. 3.

In carrying out my invention I provide a double wheel 1 having tires 2, 2. The tires are separated one from the other by a relatively short space so that they may straddle a row of small plants but still be close enough together to run between rows of larger plants without injuring the plants.

Carried on the axle of the wheel 1 are the usual stilts 3, 3 terminating in handle 4, 4. The inclination of the stilts is such that the handles are at the proper distance above the ground to be grasped by the hands of the operator. The axle also carries a bifurcated beam 5 to which are secured the various operative parts of the device. The rear end of the beam carries a link 6 which extends upward and is secured to a cross-bar 7 carried by the stilts 3, 3. The link is provided with perforations 8 adapted to be engaged by a pin 9 which also engages a fitting carried by the cross-bar. By this construction the beam may be raised or lowered and the depth of cut regulated. In the embodiment of the invention illustrated the link 6 is shown as being composed of two parts parallel to each other and engaging on opposite sides of the fitting but it will be understood that a single link may be employed if desired.

The lower extremities of the link members extend below the beam 5 and are bent forward. The forward extensions form a double track or guide 10 on which a stirrup 11 is movable. The stirrup carries a plowshare 12. A stem 13 extends upwardly from the share and is screw threaded at its upper extremity. The threaded portion of the stem engages a nut 14 rotatably mounted in the rear end of the beam. The nut is in the form of a wheel and has its edge milled in order that it may be manipulated by hand.

On each side of the rear end of the beam is a bearing 15 and in each bearing is a shaft 16. Each shaft has a right angle extension 17 at its lower end. Rigidly secured to the upper end of each shaft is an angle arm 18 and the extremities of said arms are connected by means of a spring 19. The arm 18 is at right angles to the extension 17 and the tendency of the spring to draw the arms toward each other will move the extensions in the opposite direction.

Loosely mounted on the shaft 16 at each side of the beam is a lever 20. One of said levers has pivoted at its extremity a bolt 21 which extends through a slot 22 in the other lever 20. A hand operated nut 23 engages the threads on the bolt and abuts against the slotted end of the lever 20. Each lever 20 is provided with an arm 24 which engages a down turned finger on an angle arm 18. The tension of the spring 19 tending to draw the angle arms toward each other will, by the engagement of the fingers on the angle arms with the arms 24, exert power to draw the latter arms together and to separate the extremities of the levers 20.

By manipulating the nut 23 the positions of the levers 20, the angle arms 18, the shafts 16 and the extensions 17 may be varied.

Each extension 17 carries a plurality of teeth 25. The teeth are loosely pivoted to the extensions and are adapted to swing horizontally relatively to the extensions. The teeth 25 engage the ground and rake its surface.

The operation is as follows:

When it is desired to use the device as a plow the nut 14 is turned to force the stem 13 and share 12 downward. When the handles are in the proper position to be grasped by the hands the share will be forced into the ground to the depth determined by the position of the stem relatively to the nut 14. The device is now pushed forward and a furrow is formed.

The seed is now dropped in the furrow. The share is now raised to its uppermost position by turning the nut 14. The device is now pushed over the ground with the wheel 1 straddling the furrow. The share will not engage the ground. The teeth 25 will engage the earth thrown up by the share and level it by a raking action and fill the furrow and cover the seed therein. When the teeth 25 strike an obstruction such as a stone or hard clod they will pivot horizontally on the extensions 17 and instead of riding over the obstruction will pass around it being always in contact with the ground and harrowing or raking its surface.

When the plants are given their first cultivation they are quite small and are not spread over the ground to any considerable extent. This cultivation is accomplished with the share raised as before. The nut 23 is screwed up to bring the extensions 17 toward the center line of the device as shown in full lines in Fig. 3. The device is moved along over the row with the wheel straddling it. The machine is operated by pushing it forward, then backward a short distance and then forward. During the forward movement the teeth 25 will lie close to the plants and cut the weeds and agitate the soil close to the roots. On the backward movement the extensions will pivot in the bearings 15 and swing outward. On the next forward movement they will be drawn toward the center line. This swinging movement of the extensions together with the independent pivoting of the teeth 25 will thoroughly rake the ground between the rows and cut down the weeds.

When the plants have attained such a growth that it is no longer safe to use the device straddling the rows, because of possible injury to the plants, the tool is operated between the rows, the short distance between the tires of the wheel permitting this to be done. When so used the share 12 is lowered till its point is on a line with the points of the teeth 25 and the extensions 17 are adjusted so that their outer end will come as close as practicable to the plants in two rows. The machine is now pushed forward, then back part of the distance, then forward again. On the push forward and pull backward the extensions function as before and the outward swing is limited by the adjusting nut, so that the plants are not injured.

The extreme width of surface acted on by the device is limited only by the lengths of the extensions 17 and will vary from a single cut of the shallowest depth, made by the plowshare alone, to the extreme width reached when the extensions are at right angles to the beam.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having thus described my invention what I claim and desire to secure by Letters Patent, is:

1. A garden tool, having a wheel, stilts carried by the wheel, a beam carried by the wheel, a bearing on each side of the beam, a shaft carried in each bearing, ground engaging tools carried by each shaft, means for holding the tools carried by one shaft in position relatively to the tools carried by the other shaft and to the track of the wheel, means for adjusting the positions of the tools laterally, and means for adjusting the tools vertically relatively to the wheel and stilts.

2. A garden tool, having a wheel, stilts carried by the wheel, a beam carried by the wheel, means for adjusting the beam relatively to the wheel, a bearing on each side of the beam, a vertical shaft carried in each bearing, ground engaging tools carried by each shaft, a spring for holding the tools in position relatively to the track of the wheel, and means for simultaneously adjusting the positions of the tools.

3. A garden tool, having a wheel, stilts carried by the wheel, a beam carried by the wheel, means for adjusting the beam relatively to the wheel, a bearing on each side of the beam, a shaft carried in each bearing, a gang of independently movable, ground engaging tools carried by each shaft, means for holding the gangs in position relatively to the track of the wheel, and means for adjusting the positions of the tools.

4. A garden tool, having a wheel, stilts carried by the wheel, a beam carried by the wheel, means for adjusting the beam relatively to the wheel, a bearing on each side of the beam, a shaft carried in each bearing, independently movable ground engaging tools carried by each shaft, a spring for rotating the shafts in one direction, and means for rotating the shafts in the other direction.

5. A garden tool, having a wheel, stilts carried by the wheel, a beam carried by the wheel, means for adjusting the beam relatively to the wheel, a bearing on each side of the beam, a shaft carried in each bearing, ground engaging tools carried by each shaft, a spring for yieldingly holding the tools in position relatively to the track of the wheel, and a screw and nut for adjusting the positions of the tools against the tension of the spring.

6. A garden tool, having a wheel, a beam carried by the wheel, a bearing on each side of the beam, a shaft in each bearing, a finger rigidly secured to each shaft, a spring connecting the fingers to move them toward each other, means for limiting the movement of the fingers, and ground engaging tools carried by the shafts.

7. A garden tool, having a wheel, a beam carried by the wheel, a bearing on each side of the beam, a shaft in each bearing, a finger rigidly secured to each shaft, a spring connecting the fingers to move them toward each other, means for limiting the movement of the fingers, angular extensions on the shafts, and independently pivoted, ground engaging tools carried by the extensions.

8. A garden tool, having a wheel, a beam carried by the wheel, a bearing on each side of the beam, a shaft in each bearing, a finger rigidly secured to each shaft, a spring connecting the fingers to move them toward each other, a lever loosely mounted on each shaft, an arm on each lever, each arm engaging a finger, a bolt pivoted to one of said levers and passing through a slot in the second lever, and a nut on the bolt and engaging the second lever, whereby the levers may be drawn together to separate the fingers against the tension of the spring.

9. A garden tool, having a wheel and an axle, a beam pivoted to the axle, a guide carried by the beam, a plow or shovel carried on the guide, a threaded stem on the plow, and a nut engaging the threads, said nut being held against movement longitudinally of the stem by the beam.

10. A garden tool, having a wheel and an axle, a bifurcated beam straddling the wheel and supported on the axle, a link for adjusting the position of the beam, an extension in the link, a plow or shovel adapted to engage the ground in line with the wheel, a stirrup carried by the plow, said extension entering the stirrup, a stem on the plow and a nut for moving the plow relatively to the extension.

This specification signed and witnessed this sixteenth day of January, 1917.

HENRY C. STRACK.

Witnesses:
WILLIAM G. ELLIS,
HARRIET E. DUNHAM.